US009032325B2

(12) United States Patent
Janssen et al.

(10) Patent No.: US 9,032,325 B2
(45) Date of Patent: May 12, 2015

(54) MANAGEMENT OF LOCAL APPLICATIONS IN LOCAL AND REMOTE DESKTOPS IN A SERVER-BASED COMPUTING ENVIRONMENT

(75) Inventors: Bob Janssen, Lage Zwaluwe (NL); Peter Gerardus Jansen, Oosterhout (NL)

(73) Assignee: Real Enterprise Solutions Development B.V., 'S-Hertogenbosch (NL)

( * ) Notice: Subject to any disclaimer, the term of this patent is extended or adjusted under 35 U.S.C. 154(b) by 905 days.

(21) Appl. No.: 13/184,870

(22) Filed: Jul. 18, 2011

(65) Prior Publication Data
US 2012/0005269 A1    Jan. 5, 2012

Related U.S. Application Data

(63) Continuation-in-part of application No. 13/102,071, filed on May 6, 2011.

(30) Foreign Application Priority Data

Jun. 8, 2001   (EP) .................................... 01202210

(51) Int. Cl.
G06F 15/16      (2006.01)
G06F 3/00       (2006.01)
G06F 3/0481     (2013.01)

(52) U.S. Cl.
CPC .................................... G06F 3/0481 (2013.01)

(58) Field of Classification Search
CPC ............................. G06F 3/1454; G06F 3/0481

USPC .................................. 715/778, 779, 769, 799
See application file for complete search history.

(56) References Cited

U.S. PATENT DOCUMENTS

| | | | | |
|---|---|---|---|---|
| 5,726,669 | A  * | 3/1998 | Obata et al. ..................... | 345/2.2 |
| 6,370,552 | B1 * | 4/2002 | Bloomfield .................... | 715/234 |
| 6,437,803 | B1 * | 8/2002 | Panasyuk et al. ............. | 715/733 |
| 6,571,245 | B2 * | 5/2003 | Huang et al. ........................... | 1/1 |
| 6,691,154 | B1 * | 2/2004 | Zhu et al. ....................... | 709/204 |
| 6,710,788 | B1 * | 3/2004 | Freach et al. .................. | 715/778 |
| 6,931,600 | B1 * | 8/2005 | Pittman ......................... | 715/767 |
| 6,963,908 | B1 * | 11/2005 | Lynch et al. ................... | 709/220 |
| 6,981,041 | B2 * | 12/2005 | Araujo et al. .................. | 709/224 |
| 7,657,837 | B2 | 2/2010 | Shappir et al. | |
| 8,181,114 | B2 * | 5/2012 | Saka ............................. | 715/748 |
| 2002/0057295 | A1 * | 5/2002 | Panasyuk et al. ............. | 345/804 |

(Continued)

*Primary Examiner* — Daeho Song
(74) *Attorney, Agent, or Firm* — Steven M. Koehler; Westman, Champlin & Koehler, P.A.

(57) ABSTRACT

In a computing environment comprising multiple desktop windows displayed to a user of a client computer, a method to manage client application windows associated with applications configured to run on the client computer is provided. The method includes detecting user input regarding movement of a client application window from a client desktop window to a remote desktop window, removing a task bar icon associated with the client application window from a task bar displayed in the client desktop window, instructing the remote computer to generate a drone of the client application window in the remote desktop window and to display the task bar icon associated with the client application window in a task bar of the remote desktop window, and displaying the client application window always on top of all other windows. The method may further include applying appropriate clipping region to the client application window.

16 Claims, 14 Drawing Sheets

(56) References Cited

U.S. PATENT DOCUMENTS

| | | | |
|---|---|---|---|
| 2002/0080184 A1* | 6/2002 | Wishoff | 345/800 |
| 2002/0188672 A1* | 12/2002 | Janssen et al. | 709/203 |
| 2002/0196279 A1* | 12/2002 | Bloomfield et al. | 345/749 |
| 2009/0070404 A1 | 3/2009 | Mazzaferri | |

* cited by examiner

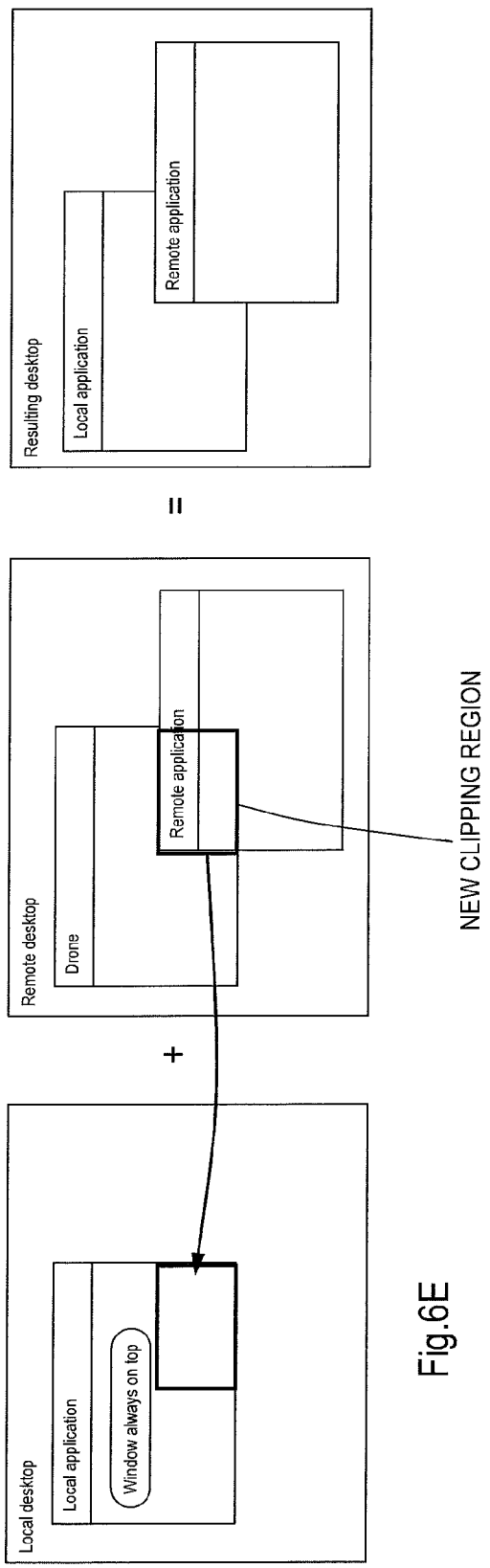

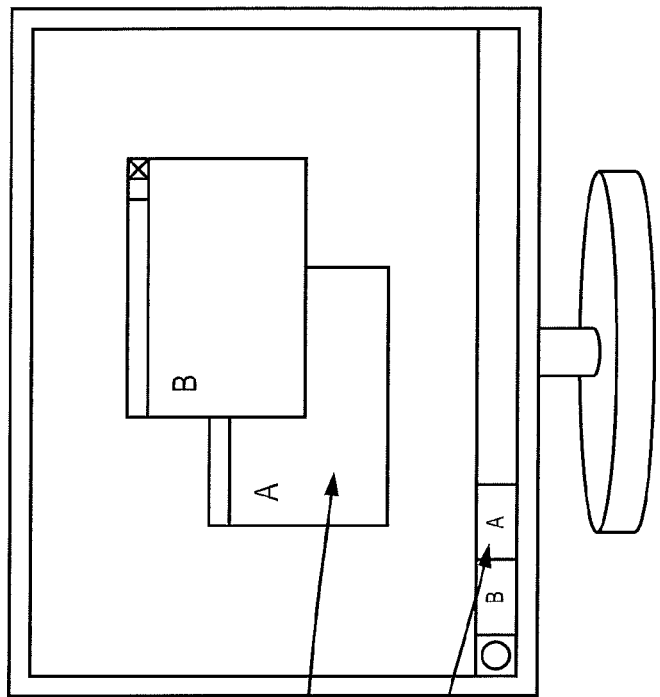
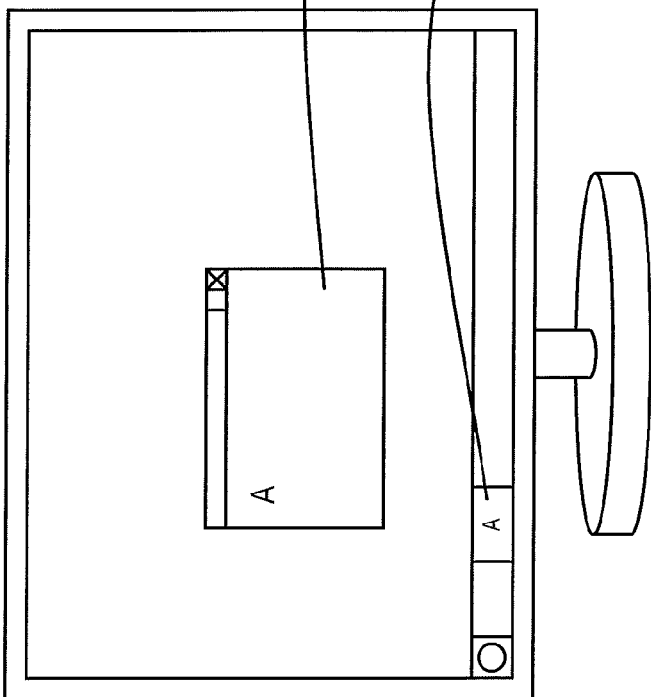
Fig.9

MANAGEMENT OF LOCAL APPLICATIONS IN LOCAL AND REMOTE DESKTOPS IN A SERVER-BASED COMPUTING ENVIRONMENT

REFERENCES TO RELATED APPLICATIONS

This application claims priority as a continuation-in-part application to U.S. patent application Ser. No. 13/102,071, entitled "Integrated Icon View in a Server-Based Computing Environment," filed May 6, 2011, which claims priority as a continuation-in-part application to U.S. patent application Ser. No. 12/274,216, entitled "Server-Based Computing Environment," filed Nov. 19, 2008, which claims priority as a continuation application to U.S. patent application Ser. No. 10/040,149, entitled "Server-Based Computing Environment," filed Jan. 2, 2002, which claims priority to European patent application No. 01202210, entitled "Server-Based Computer Environment," filed Jun. 8, 2001.

BACKGROUND OF THE INVENTION

The invention relates to a server-based computing system, comprising at least one server and at least one client computer, connected to the server through a network, wherein the server comprises means for providing the client computer with a user interface, wherein the client computer comprises an input device for providing input to an application and a display device for presenting output from an application through the user interface, wherein the server comprises means for running the application, wherein the client computer comprises means for locally running at least one further application.

The invention further relates to a method for providing a client computer with a user interface for controlling at least one application that can be run locally on the client computer, which client computer is connected to a server through a network and comprises a display device, an input device and means for running the application.

Known systems of the above-mentioned kind are capable of providing a user interface to the client computer, enabling the client computer to control an application running on the server. Such a set-up is useful in networks containing several client computers. Applications are all installed on the server and can thus be centrally managed, updated, etc. Because the client computers only process the input from the user and present output from the application to the user, they can be very simple. They can, for example, be equipped with small hard disks or none at all and little processing power. Consequently, such client computers are known as thin clients.

However, it is not always wise or possible to rely only on server-based computing. It is sometimes desirable to run applications locally on the client. In existing systems, such applications have to be initialised separately. The user shuts down the user interface provided by the server and separately starts up the second, locally running, application.

In the known system and known method of the kind mentioned above, the client computer generates a user interface for controlling the locally running application. This gives scope for confusion, since a user has to clearly distinguish between user interfaces, remember separate functions, get used to different visual aids, etc. Without careful management and updating of all the client computers, a situation can easily arise wherein each client computer attached to the network has its own user interface. The situation can become even more confusing for the user when multiple monitors display different sessions to the user. For example, one monitor may display the local desktop of the client computer while another monitor may display a remote session provided by the server.

SUMMARY OF THE INVENTION

According to one aspect of the present invention, in a networked computing environment comprising at least a client desktop window and a first remote desktop window adapted to be displayed to a user of a client computer, where the client desktop window is adapted to display a session running on the client computer and the first remote desktop window is adapted to display a session running on a first remote computer, a method for the client computer to manage a client application window associated with an application configured to run on the client computer is provided. The method includes detecting a first user input regarding movement of the client application window from the client desktop window to the first remote desktop window, removing a task bar icon associated with the client application window from a task bar displayed in the client desktop window, instructing the first remote computer to generate a drone of the client application window in the first remote desktop window, instructing the first remote computer to display the task bar icon associated with the client application window in a task bar displayed in the first remote desktop window, and displaying the client application window always on top of all other windows.

By displaying the local application window on top of all other windows and by moving the taskbar button associated with the local application from the local desktop window to the remote desktop window, the local application window dragged over a remote session may appear to the user to be fully and seamlessly integrated with that remote session.

In one embodiment, the session running on the remote computer may include at least one additional application window associated either with an application configured to run on the client computer or with an application configured to run on the remote computer, and the method further includes steps of receiving a clipping region generated by the remote computer, where the clipping region comprises a part of the at least one additional application window overlapping with the drone of the client application window generated by the remote computer, and applying the clipping region to the client application window. The clipping region may be applied when e.g. the application associated with the at least one additional application window receives focus and/or when the clipping region changes for some other reason, such as e.g. because the user changed the size and/or the location of the client application window. In such an embodiment, the method may further comprise removing the clipping region applied to the client application window when the application configured to run on the client computer receives focus.

In one embodiment, the step of detecting a first user input may comprise detecting that the client application window is being moved away from the client desktop window and determining that the client application window at least partially overlaps with the first remote desktop window. In such an embodiment, the step of determining that the client application window at least partially overlaps with the first remote desktop window may comprise determining that, following the first user input, an overlap of the client application window with the first remote desktop window is greater than an overlap of the client application window with the client desktop window. If the networked computing environment further includes a plurality of remote desktop windows adapted to be displayed to the user of the client computer, the step of determining that the client application window at least partially overlaps with the first remote desktop window may further comprise determining that, following the first user input, an overlap of the client application window with the first remote desktop window is greater than each of overlaps of the client application window with each of the plurality of remote desktop windows.

In one further embodiment, the method may further include detecting a second user input regarding movement of the client application window from the first remote desktop window to a second remote desktop window, where the second remote desktop window is adapted to display a session running on a second remote computer, instructing the first remote computer to remove the task bar icon associated with the client application window from the task bar displayed in the first remote desktop window, instructing the second remote computer to display the task bar icon associated with the client application window in a task bar displayed in the second remote desktop window, and instructing the second remote computer to generate a drone of the client application window in the second remote desktop window.

In one embodiment, the method may further include instructing the first remote computer to display an icon associated with the client application window in one or more of a system tray window maintained by the first remote computer, a system control area maintained by the first remote computer, a notification area window maintained by the first remote computer, and a menu maintained by the first remote computer.

According to another aspect of the present invention, a client computer comprising means for carrying out steps of the method described above is provided. The "means" for performing these steps may include a processor within the client computer configured to carry out the method steps. According to yet another aspect of the present invention, a computer-readable non-transitory storage medium containing a set of instructions that, when executed by a processor, perform one or more steps of the method described above is provided.

According to yet another aspect of the present invention, in the networked computing environment described above, a method to be performed by the remote computer is provided. The method includes the remote computer generating a drone of a client application window associated with an application configured to run on the client computer in response to receiving an instruction from the client computer to generate the drone of the client application window in the remote desktop window and displaying a task bar icon associated with the client application window in a task bar displayed in the remote desktop window.

In an embodiment, the session running on the remote computer may comprise at least one additional application window associated with an application configured to run on the remote computer, and the method to be performed by the remote computer may further include determining a clipping region, where the clipping region comprises a part of the additional application window overlapping with the drone of the client application window generated by the remote computer and providing the clipping region to the client computer.

In such an embodiment, the method to be performed by the remote computer may further include the remote computer maintaining a z-order ranking of the additional application window and the drone of the client application window.

In an embodiment, the method to be performed by the remote computer may further include displaying an icon associated with the client application window in one or more of a system tray window maintained by the remote computer, a system control area maintained by the remote computer, a notification area window maintained by the remote computer, and a menu maintained by the remote computer.

According to another aspect of the present invention, a remote computer comprising means for carrying out steps of the method to be performed by the remote computer, described above, is provided. The "means" for performing these steps may include a processor within the remote computer configured to carry out the method steps. According to yet another aspect of the present invention, a computer-readable non-transitory storage medium containing a set of instructions that, when executed by a processor, perform one or more steps of the method to be carried out within the remote computer described above is provided.

BRIEF DESCRIPTION OF THE DRAWINGS

The invention will now be explained in further detail with reference to the enclosed drawings, of which

FIGS. 6B-6E show schematically how integrated z-ordering of local and remote applications is obtained according to embodiments of the present invention.

FIGS. 7-9 show schematically how, in a multiple-monitor environment, a local application window may become managed and unmanaged by remote sessions displayed on different monitors, according to various embodiments of the present invention.

DETAILED DESCRIPTION OF THE PREFERRED EMBODIMENTS

Figure 1:
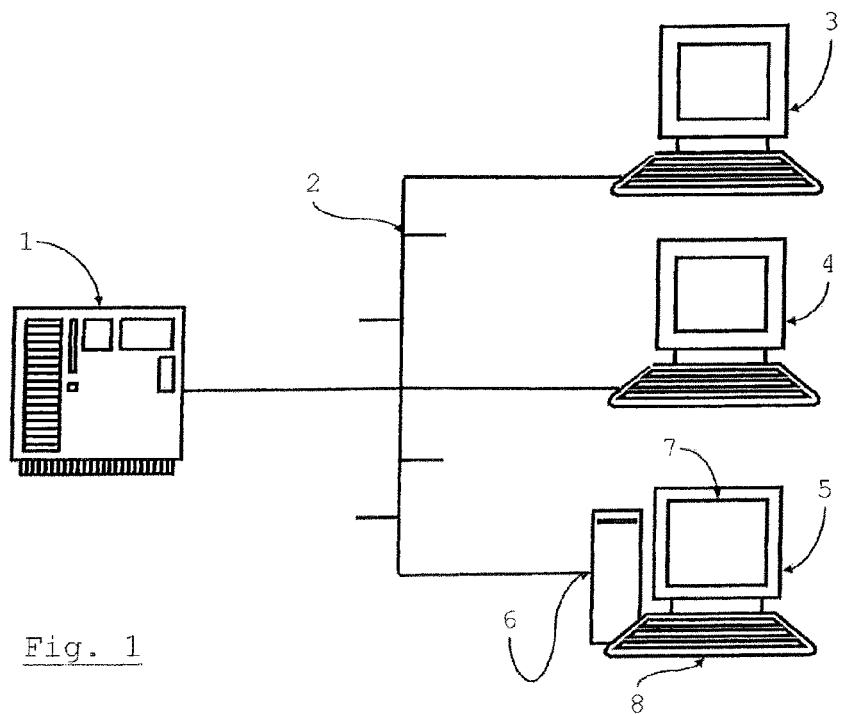
FIG. 1 shows an embodiment of the system according to the invention.

FIG. 1 shows schematically an example of a system according to the invention. The system comprises a server 1, attached to a network 2. The server 1 comprises one or more processors, RAM, and storage means, e.g. an array of hard disks. The processing capacity and memory are sufficient for running several demanding applications concurrently on the server 1. The invention is not limited to server-based computing systems comprising only one server. There can be several central servers, collectively known as a server farm. In this case, processing and storage capacity could be unevenly distributed over the servers, with some servers dedicated to running demanding applications and others to storing or transmitting data.

The network 2 can be a Local Area Network, a Wide Area Network or the Internet. It can contain wireless connections, dial-up connections or fixed cable connections.

FIG. 1 shows three client computers 3-5, attached to the network 2. Of course, the invention is not limited to the particular configuration of FIG. 1. Any number of client computers could be attached to the network 2. The client computers 3-5 can be of any kind.

A first and second client computer 3, 4 respectively, comprise a screen, a keyboard and/or a pointer device, such as a mouse. The server 1 provides these client computers 3,4 with a user interface to applications running on the server 1. Since the first and second client computers 3, 4 are not intended for operation as stand-alone devices, but merely to provide input to and receive output from applications running on the server 1, their processing capacity can be limited. Likewise, they can have limited or no capacity for permanently storing data. The first and second client computers 3,4 are merely provided with such processing capacity and memory as are necessary to process the input and display output, and exchange these with the server 1 over the network 2. For this reason, they are also known as thin clients or network computers.

The system of FIG. 1 also comprises a third client computer 5, which does comprise means 6 for locally running an application, i.e. the necessary processing power, memory and data storage capacity. When an application is run locally, the processor in the third client computer 5 executes the application code. Because of these extended capabilities, computers such as the third client computer 5 are also known as fat clients.

There are several reasons as to why it should be desirable to include such fat clients in a server-based computing system. It is possible that an application is not suitable for running centrally. If migration is taking place from a system wherein all applications are run locally, to a central server-based computing environment, some of the old, so-called legacy software might still be needed. Other applications cannot be centrally run in principle, e.g. streaming media applications. Certain applications require specialised graphics capabilities that are best provided locally, or they rely on a locally attached device, for instance a scanner or dongle. In other cases, it might simply be cheaper to have several single-user licenses rather than a multi-user license. It might also be necessary to include in the network 2 workstations with the capability of running an additional or different operating system.

In addition, it might be necessary or useful to have a fall-back mechanism for mission-critical applications that are installed on the server 1. If the server 1 should fail, access to a mission-critical application will be impossible until the problem with the failed server 1 has been solved. If, in such a situation, it is possible to run the application on the third client computer 5, the impact on the user organisation is limited to not being able to use the other, non-mission critical applications installed on the server 1.

The third client computer 5 shown in FIG. 1 comprises a monitor with a screen 7 for displaying a user interface to an application. It further comprises an input device 8. In the shown example, this is a keyboard, but other input devices can also be connected. The client computer 5 could additionally comprise a mouse, pointer, tablet, web-cam, microphone, etc. The input device 8 forms the means for providing input to an application through a user interface.

In the system according to the invention, a single user interface is provided to the client computers 3-5. It makes no difference to a user whether he is controlling the running of applications from the first client computer 3, a thin client, or the third client computer 5, a fat client. The only difference is that on the third client computer 5, additional, locally running applications can be initiated and controlled. However, this is done through the one user interface provided by the server 1 for providing input to and receiving output from centrally running applications.

In the system according to the invention, the server 1 runs an interface management program in order to provide the client computers 3-5 with the user interface. The client computer 5 runs a subscriber program that facilitates the integration of client-based applications in the server-based user interface. The subscriber program running on the client computer 5 co-operates with the interface management program in the exchange between the server 1 and client computer 5 of user input to the interface and output from the interface. Communication between the server 1 and the client computer 5 consists of messages generated by the interface management program and the subscriber program respectively.

FIGS. 2A-2D show schematically the composition of the display of the user interface. The figures refer to several situations that occur in embodiments of the system according to the invention.

Figure 2A:
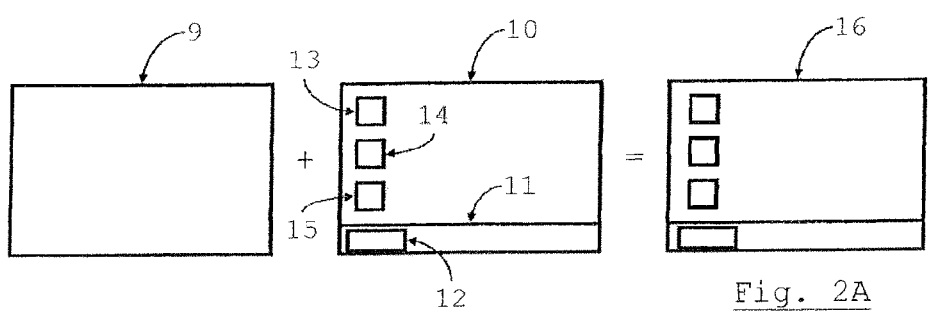
FIG. 2A-D show the composition of the display of the user interface in different situations during use of an embodiment of the system according to the invention.

FIG. 2A shows a local client screen area 9. This is a screen area generated locally on the client computer 5. FIG. 2A further shows a central application screen area 10. This screen area is generated on the server 1. It comprises a display of output from any applications running centrally on the server 1 and components that are generated by the interface management program regardless of whether any applications are running on the server 1.

These last-mentioned components comprise a central task bar 11, allowing the user to control the display of output. A button 12 on the task bar 11 forms a means for selecting and changing features of the interface. Further buttons can be present, depending on how many applications are running at any one moment.

The central application screen area 10 further comprises icons 13-15, which can be selected to launch an application. A first icon 13 launches a server-based application. A second and third icon 14 and 15 respectively, form the means for initiating locally running applications.

In a preferred embodiment a database in the system comprises information on the available applications that can be run locally on the client computer 5, so that the icons 14, 15 for each of these applications can be generated by the server 1. This database can be stored at one location in the system, for example in the server 1, or parts can be stored locally, for instance in a registry file, and referred to when necessary. Other embodiments are conceivable wherein a number of messages are exchanged between client computer 5 and server 1, for instance when the client computer (5) goes on-line, in order that the latter can establish which icons to generate.

The local client screen area 9 and the central application screen area 10 are merged into one local client screen 16, which is the screen image shown on the screen 7 of the client computer 5. In the preferred embodiment this merging is taken care of by the subscriber program on the client computer 5, after data relating to the contents of the central application screen area 10 has been transferred to the client computer 5.

The subscriber and interface management programs also allow the server 1 to control the display of the user interface on the screen 7 of the third client computer 5. The server 1 controls the display properties of the interface, which comprise, for instance, the desktop size and display resolution, and adapts them to the screen 7 of the client computer 5. The interface management program generates this information. The subscriber program on the client computer 5 ensures display on the screen 7 according to the specified properties.

Figure 2B:
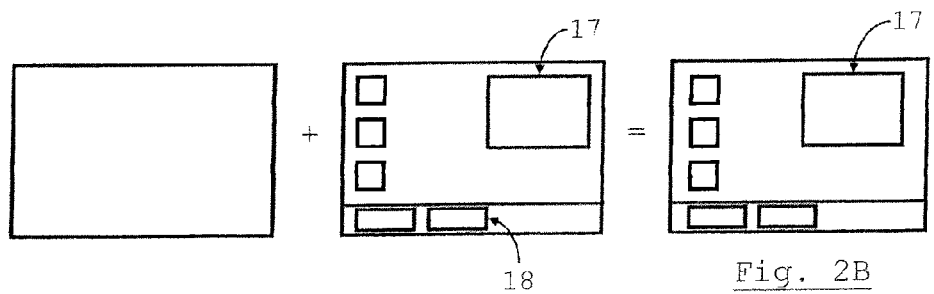

Any changes in either the local client screen area 9 or the central application screen area 10 automatically result in an updated version of the merged local client screen 16. One such change can occur, when an application on the server 1 has been launched by clicking the first icon 13. FIG. 2B shows how this leads to a changed local client screen 16. The application running on the server 1 generates a window 17 in which output from the application is displayed. Of course, within the scope of the invention, some applications can generate more than one window. The creation of the window 17 leads to the creation of a button 18 in the central task bar 11. As described before, the local client screen area 9, which in this case is still empty, and the central application screen area 10 are merged into the merged local client screen 16. A user of the client computer 5 can switch to the application by clicking the button 18.

Figure 2C:
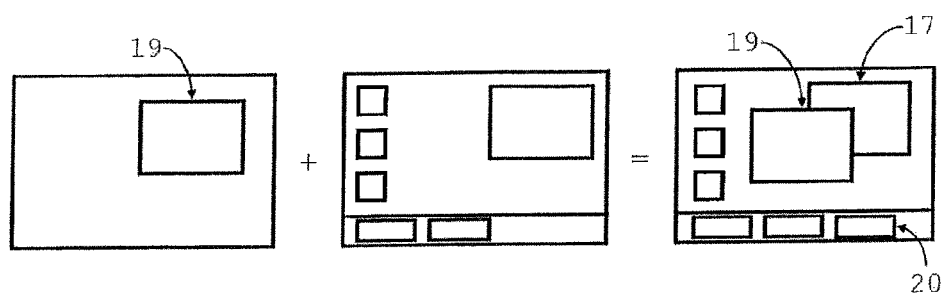

In FIG. 2C the situation is shown, wherein the user has launched an application running locally on the client computer 5, by clicking one of the two icons 14, 15. The exact procedure followed in the system as a result of this launch command is described in further detail below with reference to FIG. 3. The result of the launch of a second application, running locally on the client computer 5, is a window 19 in the local client screen area 9, containing the output of the locally running application. As before, the local client screen area 9 is merged with the central application screen area 10, which in FIG. 2C is unchanged with respect to the FIG. 2B, into the merged local client screen 16. Changes in the contents of the window 19 automatically result in an updated version of the merged local client screen 16.

As a result of the launch of the locally running second application, there are now two windows 17, 19 in the merged local client screen 16. A user can make one of the windows 17, 19 active, by clicking on that window. As a result of this clicking action, a signal generated by the subscriber program is sent from the client computer 5 to the server 1, to ensure that the user interface can correctly indicate the active window to the user.

When a new window appears in the local client screen area 9 or in the central application screen area 10, either because an application has just been launched, or because the application has generated a new window in the course of its execution, this is detected. Thus, the new window can be displayed in the merged local client screen 16. A communication to the server 1 further leads to the creation of a button 20 in the central task bar 11 of the merged local client screen 16, in order that a user can switch to a newly initiated locally running application.

In a similar way, the disappearance of the window 19 associated with the locally running application is communicated to the server 1. The window can disappear when execution of the application has finished, or when there are several windows belonging to one locally running application and the application no longer needs one of them. Using the subscriber program, a signal is sent from the client computer 5 to the server 1 indicating that the window 19 has been closed, so that the user interface can display the correct buttons 12, 18, 20 in the task bar 11, both of applications running on the server 1 and of applications running on the client computer 5.

In an advantageous embodiment of the invention, a window further comprises a title area, not shown. The title can change in the course of running the application associated with a window. The buttons 12, 18, 20 comprise a caption relating to the title. If the title of the window 17 associated with the locally running application changes, a signal is generated and communicated to the server 1, using the interface management and subscriber programs. The captions in the central task bar 11 are then automatically updated.

Similarly, each button 12, 18, 20 comprises an icon representing the application associated with it. The icon can also change in the course of time. Changes lead to an automatic update of the central application screen area 10 and merged local client screen area 16 in a manner similar to the mechanism used when a caption needs to be updated.

When the user clicks on one of the buttons 12, 18, 20, this input is signalled to the server 1. If the user has clicked on the button 18 associated with the application running on the server 1, the interface management program ensures that the user can control that application through the interface. If the user has clicked on the button 20 associated with the locally running application, a switch is made to that application. In this process, messages are exchanged between the server 1 and the client computer 5, which are handled by the subscriber program and the interface management program.

The protocol by which signals are exchanged between the client computer 5 and the server 1 further allows for the termination of all locally running applications. The server 1 sends a command to the client computer 5 to terminate the running applications. When all applications have successfully been shut down, this is communicated to the server 1, which can then update the user interface.

Figure 2D:
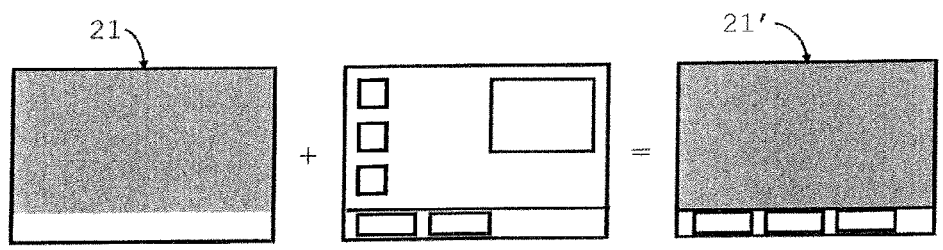

A user can also maximise the window 19 associated with the locally running application, as is shown in FIG. 2D. A maximised window 21 now fills the local client screen area 9. A transferred version 21' of the maximised window 21 in the merged local client screen 16 does not, however obscure the central task bar 11, so that a user can still switch between applications. This follows from the fact that the server comprises means for controlling the display of the local client screen 16 on the screen 7 of the client computer 5.

Figure 3:
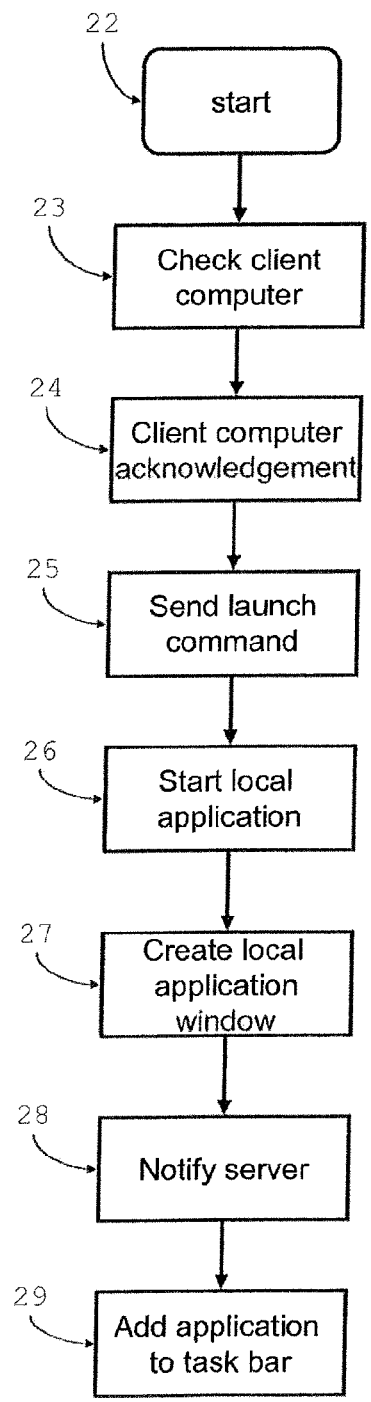
FIG. 3 shows schematically some steps in an embodiment of the method according to the invention, which describe in more detail the process by which a locally run application is launched.

Turning now to FIG. 3, a more detailed description of the process, by which the running of an application on the client computer 5 is initiated, will be given. The process is started in a first step 22, by a user clicking on one of the icons 14, 15 for initiating locally run applications. The interface management program processes this input. Once it has been determined that the icon is associated with a local application on the client computer 5, a message is sent in a subsequent step 23 to the client computer 5, to check that the subscriber program is running. In a next step 24, the client computer 5 returns an acknowledgement message, generated using the subscriber program, to the effect that the subscriber program is running.

The interface management program on the server 1 generates a message, containing a command line, which is sent to the client computer 5 in a subsequent step 25. In a next step 26, the locally running application is launched on the client computer 5 by executing the command line.

The locally running application generates its window 19, which first appears in the local client screen area 9. As the merged local client screen 16 is automatically updated, the window 19 also appears in the merged local client screen 16. The creation of the local application window 19 is symbolically depicted in step 27 of FIG. 3.

In a step 28 subsequent upon the creation of the local window 19, the subscriber program generates a message, signalling the creation of a new application window, which message is passed on to the server 1. This is the cue for a last step 29 in the flow chart of FIG. 3, namely the addition of the button 20 to the central task bar 11 in the merged local client screen 16. The local application is now fully integrated into the user interface and the situation depicted in FIG. 2C has been arrived at.

Integrated Icon View

In a further embodiment, a method for providing, by the server 1, access to graphical data associated with at least an application configured to run on the client computer 5 is proposed. Such graphical data could be e.g. the second icon 14 (or the third icon 15) associated with locally run applications, described in paragraph [0046] above. The method includes, first, receiving, at the server 1, information on an icon (e.g., the second icon 14) associated with the application configured to run on the client computer 5 (i.e., the locally run application). This functionality is described in paragraph [0047] above, explaining that a number of messages is exchanged between the client computer 5 and the server 1 in order to enable the server 1 to establish which icons to generate. The method further includes providing, by the server 1, to the client computer 5, a screen (i.e., the central application screen area 10) displaying a plurality of icons, the plurality of icons including at least the icon associated with the locally run application (icon 14 or 15) and an icon (the first icon 13) associated with an application configured to run on the server, as described in e.g. paragraphs [0046] and [0048].

In an embodiment, the above-described method could further include receiving, at the server 1, a request for access to the locally run application and associated with the second icon 14 (see paragraphs [0051], [0060], and [0061]) and redirecting, by the server 1, the request to the client computer 5 (see paragraph [0061]). As described above in paragraph [0060] above, running of the initially run applications can be initiated by clicking on the icons 14, 15. The interface management program on the server 1 processes the input indicating the user clicking on the icons 14, 15, meaning that the server 1 receives a request for access to the locally run applications. As further described in paragraph [0061] above, the interface management program on the server 1 then generates and send to the client computer 5 a message containing a command line instructing the client computer 5 to launch the locally run application, meaning that the server 1 redirects the request to the client computer 5.

The step of receiving the request for access to the application configured to run on the client computer could e.g. include receiving an identification of a user interaction with the second icon 14. As is described in paragraphs [0051], [0052], and [0058] above, the identification of the user interaction with the second icon 14 could indicate e.g. that the user launched an application associated with the second icon 14, closed the application associated with the second icon 14, or made the window associated with the application active.

In an embodiment, the step of receiving the information on the second icon 14 could include receiving at least one of an identification of the second icon 14 and a file including the second icon 14. The information on the second icon 14 could be e.g. information enabling the server 1 to generate the second icon 14, as described in paragraph [0047] above.

In an embodiment, the screen provided by the server 1 to the client computer 5 could comprise a system tray window displaying the plurality of icons, a system control area displaying the plurality of icons, a notification area window displaying the plurality of icons, or a menu displaying the plurality of icons, which could make the interface display at the client computer 5 more user-friendly.

In an embodiment, the method could further include modifying the screen 10 by e.g. removing from the plurality of icons a duplicate icon, which could be done using a filter within the server 1 either before or after the screen 10 is provided to the client computer 5. In another embodiment, the screen 10 could be modified by generating, by the server 1, a screen displaying the plurality of icons, the plurality of icons including at least the first icon 13 and a modified version of the second icon 14. The modified version of the second icon 14 may then replace the original version of the second icon 14 (i.e., the version of the second icon 14 prior to the modification).

In an embodiment, the method could further include providing to the client computer 5 a z-order entry for the screen 10 displaying the plurality of icons such that e.g. the screen 10 is displayed beneath the other windows on the client computer 5 and depicts a desktop. When the client computer 5 performs the merging of the screen 10 with the local client screen 9 to obtain the screen 16, described above, the merged screen 16 could also have an associated z-order entry so that e.g. the merged screen 16 is displayed beneath the other windows on the client computer 5 and depicts a desktop or a part thereof, such as e.g. a system tray window, a notification area window, or a menu, maintained by the client computer 5.

According to another aspect of the invention, a server capable of carrying out the method described above is also provided. Such a server is configured to provide access to graphical data (i.e., the second icon 14) associated with at least a locally run application. The server 1 then includes means for receiving information on the second icon 14 associated with the locally run application and means for providing to the client computer 5 the screen 10 displaying a plurality of icons, the plurality of icons including at least the second icon 14 and the first icon 13 associated with an application configured to run on the server 1. In an embodiment, the server 1 further includes means for receiving a request for access to the application configured to run on the client computer 5 and associated with the second icon 14 and means for redirecting the request to the client computer 5.

In an embodiment, the server 1 further includes means for providing to the client computer 5 a z-order entry for the screen 10, as described above.

In various embodiments, the server 1 further comprises means for replacing a display of a system tray, a display of a notification window, a display of a system control area window, or a display of a menu on the client computer 5 with either a display of the screen 10 displaying the plurality of icons or with a display of the merged screen 16.

The server 1 could further include means for receiving an identification of the second icon 14 and/or a file including the second icon 14.

In an embodiment, the server 1 further includes means for modifying the screen displaying the plurality of icons, the plurality of icons including at least first icon 13 and a modified version of the second icon 14.

A corresponding method for providing access to graphical data associated with at least a locally run application carried out at the client computer 5 includes providing to the server 1 information on the second icon 14 associated with the locally run application and receiving, from the server 1, the screen 10 displaying a plurality of icons, the plurality of icons including at least the first icon 13 associated with an application configured to run on the server 1 and the second icon 14. The method further includes displaying, by the client computer 5, a screen image formed according to the screen 10 provided by the server 1.

In an embodiment, the screen image displayed at the client computer 5 comprises an image formed by merging, at the client computer 5, of the screen 10 received from the server and a local client screen (i.e., the local client screen area 9).

In an embodiment, the step of displaying the screen image on the client computer 10 could include replacing a display of a system tray on the client computer 5 with a display of the screen 10 provided by the server or with a display of the merged screen 16. In other embodiments, the screen 10 or the merged screen 16 could replace a display of a system control area maintained by the client computer 5, a display of a notification area maintained by the client computer 5, a display of a system control area maintained by the client computer 5, or a display of a menu area maintained by the client computer 5.

In various embodiments, the first icon 13 and/or the second icon 14 could be displayed in one or more of a system tray window maintained by the client computer 5, a system control area maintained by the client computer 5, a notification area window maintained by the client computer 5, and a menu maintained by the client computer 5.

According to an aspect of the invention, a corresponding client computer is proposed. The proposed client computer 5 includes means for providing, to the server 1, information on the second icon 14 associated with the locally run application, means for receiving, from the server 1, the screen 10 displaying a plurality of icons, the plurality of icons including at least the first icon 13 associated with an application configured to run on the server 1 and the second icon 14, and means for displaying a screen image formed according to the screen 10 provided by the server.

In another aspect of the invention, a method for providing, by the client computer 5, access to graphical data associated with at least an application configured to run on the server 1 is provided. The method includes receiving, at the client computer 5, information on the first icon 13 associated with the application configured to run on the server 1, as described in paragraph [0047] above specifying that the client computer 5 receives from the server 1 the contents of the central application screen area 10, including icons 13-15. The method further includes incorporating, by the client computer 5, the first icon 13 into a merged local client screen 16 displaying, to a user of the client computer 5, a plurality of icons on the client computer 5, the plurality of icons including at least the first icon 13 and the second icon 14 associated with a locally run application. The method further includes redirecting, by the client computer 5, to the server 1, a request for access to the application configured to run on the server and associated with the first icon 13 (as is described in paragraph [0050] above, the user can launch an application on the server 1 by clicking the first icon 13).

In an embodiment, the method further includes providing, by the server 1, access to the application configured to run on the server and associated with the first icon 13.

In an embodiment, the step of incorporating the first icon 13 into the local client screen 16 comprises incorporating the first icon 13 into a local system tray window displaying the plurality of icons, the plurality of icons including at least the first icon 13 and the second icon 14.

According to yet another aspect of the invention, the client computer 5 can provide access to graphical data associated with at least an application configured to run on the server 1. Such a client computer includes means for receiving information on the first icon 13 associated with the application configured to run on the server, means for incorporating the first icon 13 into a local client screen 16 displaying, to a user of the client computer, a plurality of icons on the client computer, the plurality of icons including at least the first icon 13 and the second icon 14 associated with an application configured to run on the client computer, and means for redirecting to the server a request for access to the application configured to run on the server and associated with the first icon 13.

Z-Order Clipping

Further embodiments explained with reference to FIGS. 4-6E deal with a z-order of windows displayed to a user of the client computer.

Figure 4B:
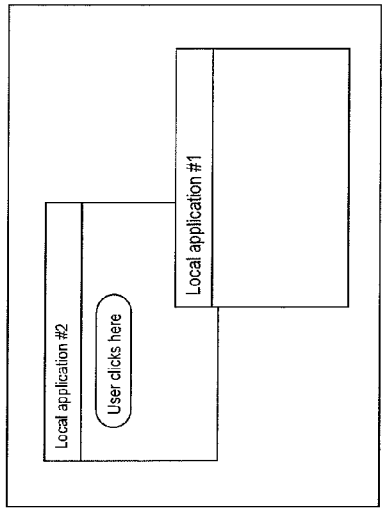
FIGS. 4A-4C show schematically z-ordering of the local applications in a local desktop, according to prior art.
Figure 4A:
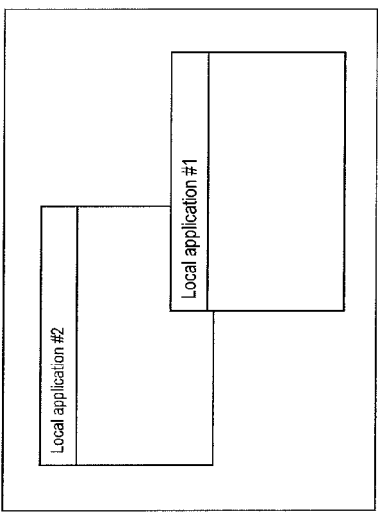

One of the features of a typical graphical user interface (GUI) is that application windows may overlap, so that one window hides part or all of another. When two windows overlap, their Z-order determines which one appears on top of the other. FIG. 4A illustrates two windows associated with two local applications running on the client computer. Their z-order is such that the window associated with the local application #1 appears on top of the window associated with the local application #2.

In the interests of brevity, the following discussion may use language such as "application X is displayed on top of application Y" or similar language. One should understand that it means that the window associated with application X is displayed on top of the window associated with application Y, where the association is such as e.g. the window displays an application interface, an output of an application, or any other information associated with the application.

One can think of the windows in a GUI as a series of planes parallel to the surface of the monitor. The windows are, therefore, stacked along the Z-axis, and the Z-order information thus specifies the front-to-back ordering of the windows on the screen.

Figure 4C:
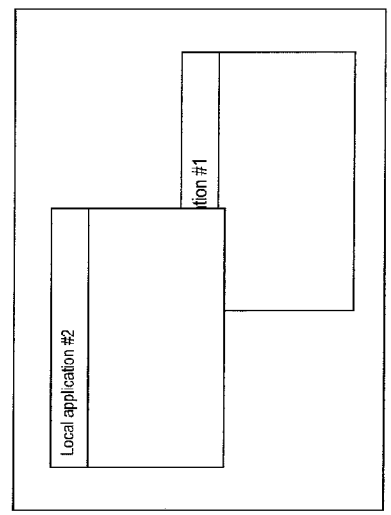

Typically, a user of a GUI can affect the Z-order by selecting a window to be brought to the foreground (that is, "above" or "in front of" or "on top of" all the other windows). This is schematically illustrated in FIGS. 4B and 4C, where FIG. 4B illustrates the user selecting the window associated with the local application #2 by clicking on that window and FIG. 4C illustrates that, as a result of this selection, the local application #2 is now displayed on top of the local application #1.

Figure 5A:
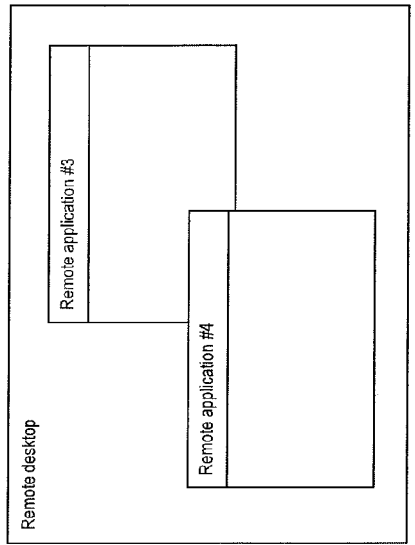
FIGS. 5A-5F show schematically separate z-ordering of the local applications in a local desktop and remote applications in a remote desktop, according to prior art.

Remote desktop technology, as the one described in the present application, allows a user of the local client computer 5 to connect to the remote server 1 from the client computer 5. An exemplary schematic illustration of how such a connection could appear on the display of the client computer 5 is provided in FIG. 5A showing a local desktop having two application windows open as well as a window for connecting to the remote computer such as e.g. the server 1.

After connecting to the server 1, a remote desktop window is typically displayed full screen on the client computer 7 allowing the user to access programs, files, and network resources available to the server 1 as though the user was actually sitting in front of the server 1.

Figure 5B:
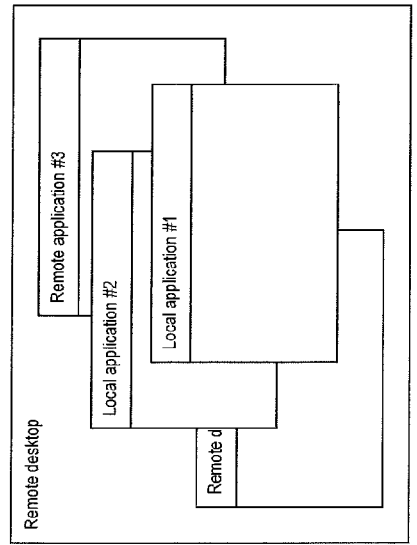

When two windows associated with applications running on the server 1 overlap, their Z-order determines which one appears on top of the other in the remote desktop window. Such a situation is schematically illustrated in FIG. 5B showing a remote desktop displayed to the user of the client computer 5, the remote desktop including a window associated with a remote application #3 and a window associated with a remote application #4, both of these applications running on the server 1. Their z-order is such that the remote application #4 appears on top of the remote application #3.

As has been implemented in the prior art up to now, the remote desktop window is not aware of local applications running on the client computer 5 and obscures them.

Figure 5C:
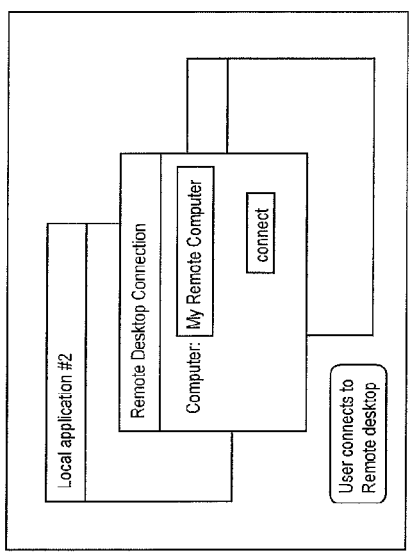

When the user brings a locally run application to the foreground (i.e., when an application running on the client computer 5 is given focus), the application window will be in front of all the other windows, including the remote desktop window, as illustrated in FIG. 5C where the local application #2 is shown to be given focus.

Figure 5D:
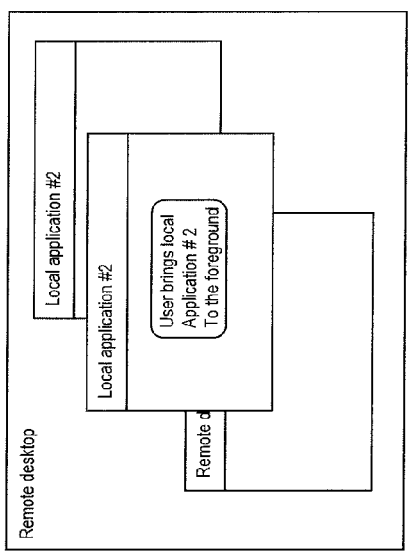

When the user brings the local application #1 to the foreground, this application window will be in front of all the other windows, as shown in FIG. 5D.

Bringing back local application #2 to the foreground displayed at the client computer 5 would still leave all windows (partially) visible.

Figure 5F:
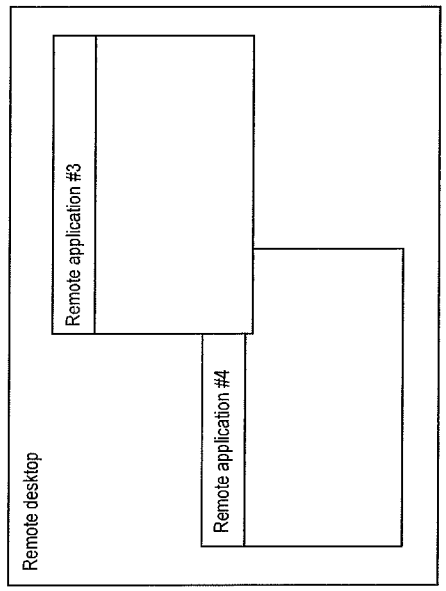
Figure 5E:
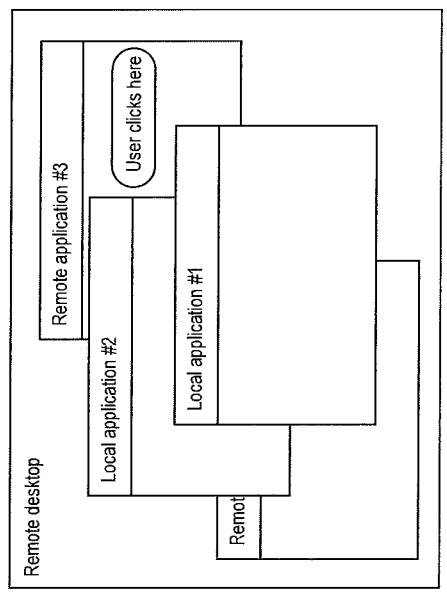

However, according to prior art implementations, if the user brings an application running on the server 1 to the foreground (e.g. the remote application #3) by e.g. clicking somewhere within the window associated with the remote application #3 displayed on the client computer 5 (as shown in FIG. 5F), all local applications will be obscured again by the remote desktop window, as shown in FIG. 5F.

Thus, in the prior art examples illustrated in FIGS. 4A-5F the local Z-order (i.e., the Z-order of the window associated with application running on the client computer 5) co-existed with the Z-order of the remote applications running on the server 1 and displayed in the remote desktop window to the user of the client computer 5. As the foregoing illustrates, what is also needed in the art is a technique that would allow providing the user with one consistent and logical Z-order for both local and remote applications.

Embodiments of the proposed solution are based on recreating the logical Z-order in the remote desktop, leveraging the built in capabilities of Windows to calculate clipping based on Z-order and apply the desired clipping to local windows that are always on top.

As previously described herein, in a networked computing environment, the server 1 can provide, to the user of the client computer 5, access to graphical data associated with an application configured to run on the client computer 5 and an application configured to run on the server 1. This is done by receiving, at the server 1, information on a first icon associated with the local application (i.e., the application configured to run on the client computer 5) and providing, by the server 1, to the client computer 5, a screen displaying a plurality of icons, the plurality of icons including at least the first icon and a second icon associated with the remote application (i.e., the application configured to run on the server 1). The client computer 5 is then configured to display the received screen to the user and the user can use the screen to control both local and remote applications. When the user launches the remote application by e.g. clicking on the second icon, the server 1 is configured to generate a server application window associated with the remote application. When the user launches the local application by e.g. clicking on the first icon, the client computer 5 is configured to generate a client application window associated with the local application.

The remote application window is included in a remote desktop maintained by the server 1. In one embodiment, the remote desktop could be the same as, form a part of, or comprise the screen 10 described above. The server 1 is configured to provide the remote desktop to the client computer 5 for display as one of the "windows" on the client computer. Persons skilled in the art will recognize that the remote desktop window may not be a "window" as a "window" in the context of an "application window" but, rather, a full desktop which may contain plurality of application windows, icons, task bar, start menu, etc.

Figure 6A:
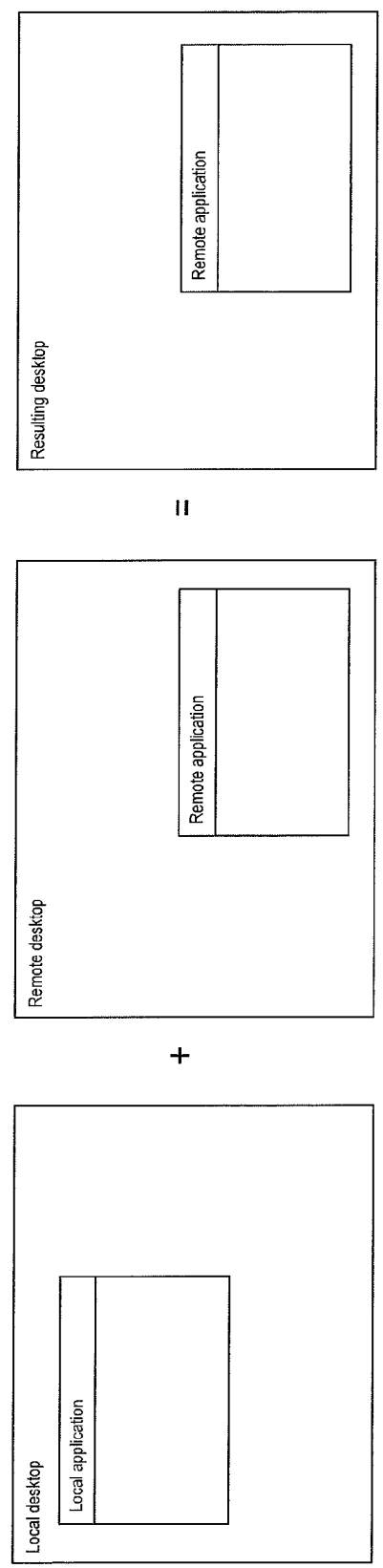
FIG. 6A shows schematically a desktop obtained as a result of combining the local desktop with the remote desktop according to prior art.

As described above, when the user would click on any part of the remote desktop window displayed on the client computer 5, the remote desktop window would be displayed on the client computer 5 over all other, client computer windows (including the local application window), so that the user would only see the remote desktop but not the window corresponding to the launched local application. This is illustrated in FIG. 6A.

Figure 6B:
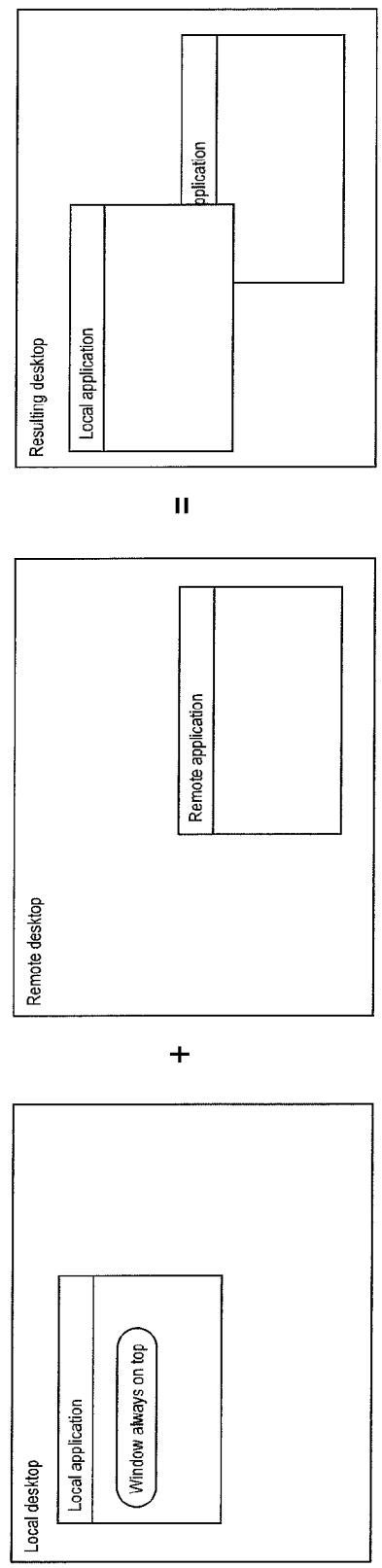

According to one embodiment of the present invention, the client computer 5 is configured to designate the local application window to be a window which is always displayed on top of all other windows, including the remote desktop window. This is illustrated in FIG. 6B. A window being designated "always on top" is a window fixed to the top of the z-order ranking so that, with a few exceptions, no other windows can overlap such a window.

Figure 6C:
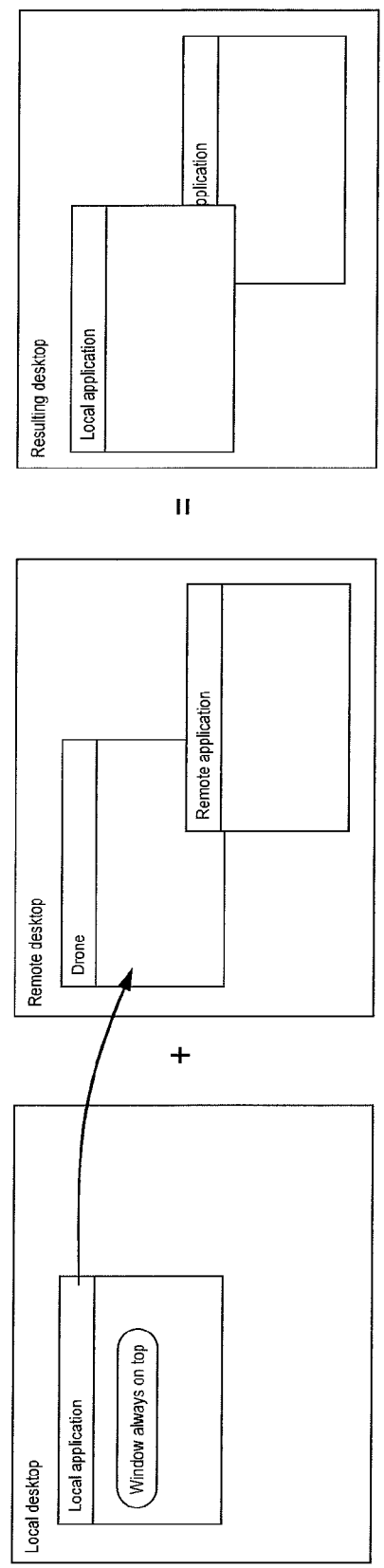

The server 1 is configured to receive from the client computer 5 information on the local application window regarding e.g. it's appearance, size, content, and position in the desktop of the client computer 5. Based on the received information, the server 1 may generate a drone or a proxy window as a copy of the local application window in the remote desktop maintained by the server 1. This is illustrated in FIG. 6C. As shown in FIG. 6C, as displayed on the client computer 5, the drone window of the remote desktop would be completely covered by the application window because the application window is designated to be always on top and because the drone window is displayed at the same position as the application window.

Figure 6D:
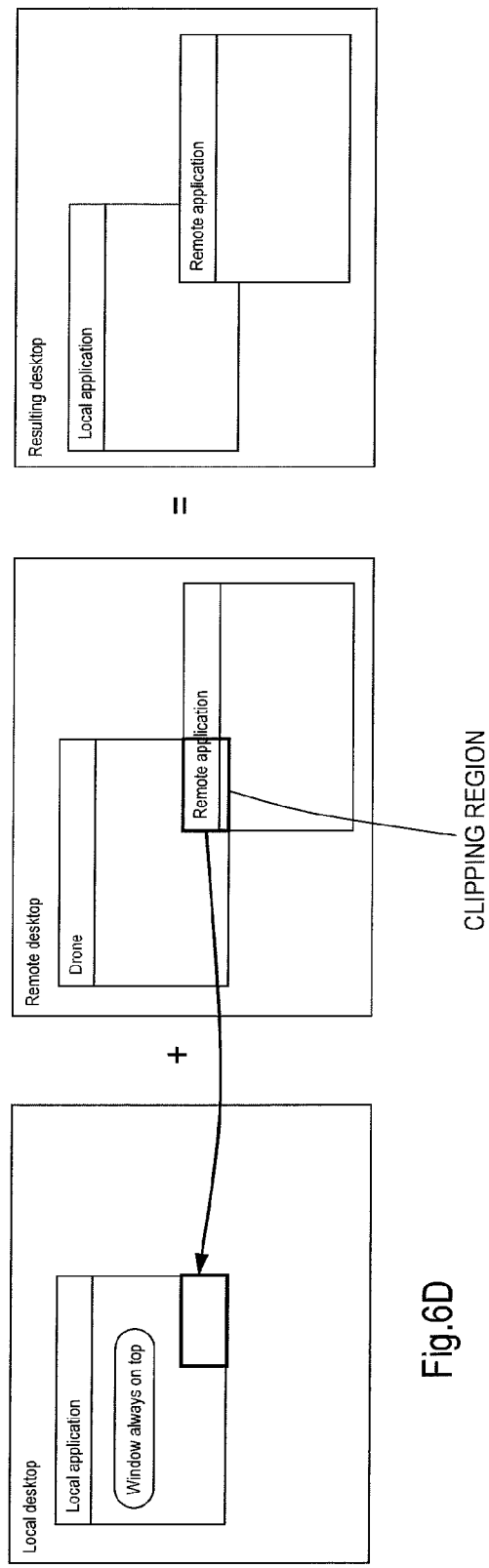

The server 1 is further configured to determine a clipping region, where the clipping region is the area of the remote application window overlapping with the local application window. The server 1 is then configured to provide information on the clipping region to the client computer 5. In turn, the client computer 5 is configured to apply the received clipping region to the local application window if the remote application receives focus in response e.g. to user's input. In this manner, the local application window is still displayed on top of all the other windows, including the remote desktop window, but because the clipping region is pasted over the local application window, it looks to the user like the local application window is under the remote application window. This is illustrated in FIG. 6D.

If the local application receives focus, the client computer 5 is configured to remove the previously applied clipping region, if any was applied, so that the local application window looks to the user like it is above the remote application window.

Persons skilled in the art will recognize how the above technique may similarly be applied to further applications, either running at the server 1 or at the client computer 5. Further, relevant steps of the above technique may be applied when there are any changes to the existing windows. For example, when the position or size of the remote application window change (as a result of e.g. the user moving the remote application window in a desktop displayed on the client computer 5), the server 1 may be configured to re-calculate the clipping region and provide updated clipping region to the client computer 5, as illustrated in FIG. 6E. In this manner, the server 1 can maintain integrated z-order ranking of the windows associated with both applications running on the server 1 and applications running on the client computer 5.

The above-described functionality may be implemented via a local agent running on the desktop of the client computer 5 and a remote agent running on the desktop of the server 1. The local agent and the remote agent establish communications by using e.g. virtual channel provided by the conventional remote desktop technology.

The local agent is configured to periodically enumerate all local application windows or place a hook to receive notifications from the operating system on window changes. This mechanism may be used to detect new local windows and notify remote agent about each new local window (including size, caption and placement). After the notification, the remote agent will create corresponding drone window in remote desktop and will notify local agent about the current clipping region of the drone window. The local agent will then apply the received clipping region to the local window and place the local window "always on top."

The local agent may further be used to detect changes in size, caption and placement of existing local windows and notify the remote agent about these changes. Remote agent will then change size, caption and placement of corresponding drone window in remote desktop. Further, the remote agent will notify the local agent about the new clipping region of the drone window so that the local agent can apply the new clipping region to the local window.

The local agent may also be used to detect removed local windows and notify the remote agent about each removed local window. The remote agent will then remove corresponding drone window in the remote desktop.

On startup any existing local windows may be treated as new local windows. The local windows of any remote desktop server may be ignored.

Similarly to the local agent, the remote agent may be configured to periodically enumerate all drone windows or place a hook to receive notifications from the operating system on window changes. This mechanism may be used to notify the local agent about changed clipping regions of the drone windows. The local agent will then apply the received clipping region to the local window.

If a local application receives the focus, the local agent will remove all of the clipping regions which may have been previously applied to the focused local application window. The local agent will also notify the remote agent to put the corresponding drone window on top.

If a remote application receives the focus, the remote agent will notify the local agent about the current clipping region of the drone window that previously was on top.

Management of Local Applications in Local and Remote Desktops in a Server-Based Computing Environment A situation could arise when a user of a client computer could be presented with multiple remote sessions simultaneously. Each remote session as well as a local session within a local desktop could cover one or more monitors. In such a multiple monitor environment, it could be desirable to enable the user of the client computer to drag and drop local application windows between the local session and remote sessions or between different remote sessions. As used herein, the term "remote session" refers to a session running on the remote computer, where the session may include one or more application windows and is displayed in a remote desktop window of the client computer. Similarly, the term "local session" refers to a session running on the client computer, where the session may also include one or more application windows and is displayed in a client desktop window of the client computer. The remote desktop window and the client desktop window may be displayed within the local desktop of the client computer, either on the same or on different monitors.

Further embodiments explained with reference to FIGS. 7-9 deal with management of local applications and local application windows (i.e. application windows associated with applications configured to run on the client computer) displayed to the user of the client computer in an environment comprising at least one monitor displaying a remote session running on a remote server such as e.g. the server 1 and at least one other monitor either displaying a local session running on the client computer such as e.g. the client computer 5 or displaying a different remote session running on a different remote server. In such an environment, three scenarios are envisioned. In a first scenario, a user of the client computer is able to move a local application window from a local session displayed on one monitor to a remote session displayed to the user on a different monitor. In a second scenario, the user of the client computer is able to move a local application window from a remote session displayed on one monitor to a local session displayed on a different monitor. In a third scenario, the user of the client computer is able to move a local application window from one remote session displayed on one monitor to another remote session displayed on a different monitor. Each of these three scenarios is now described in greater detail in association with FIGS. 7, 8, and 9, respectively.

Figure 7:
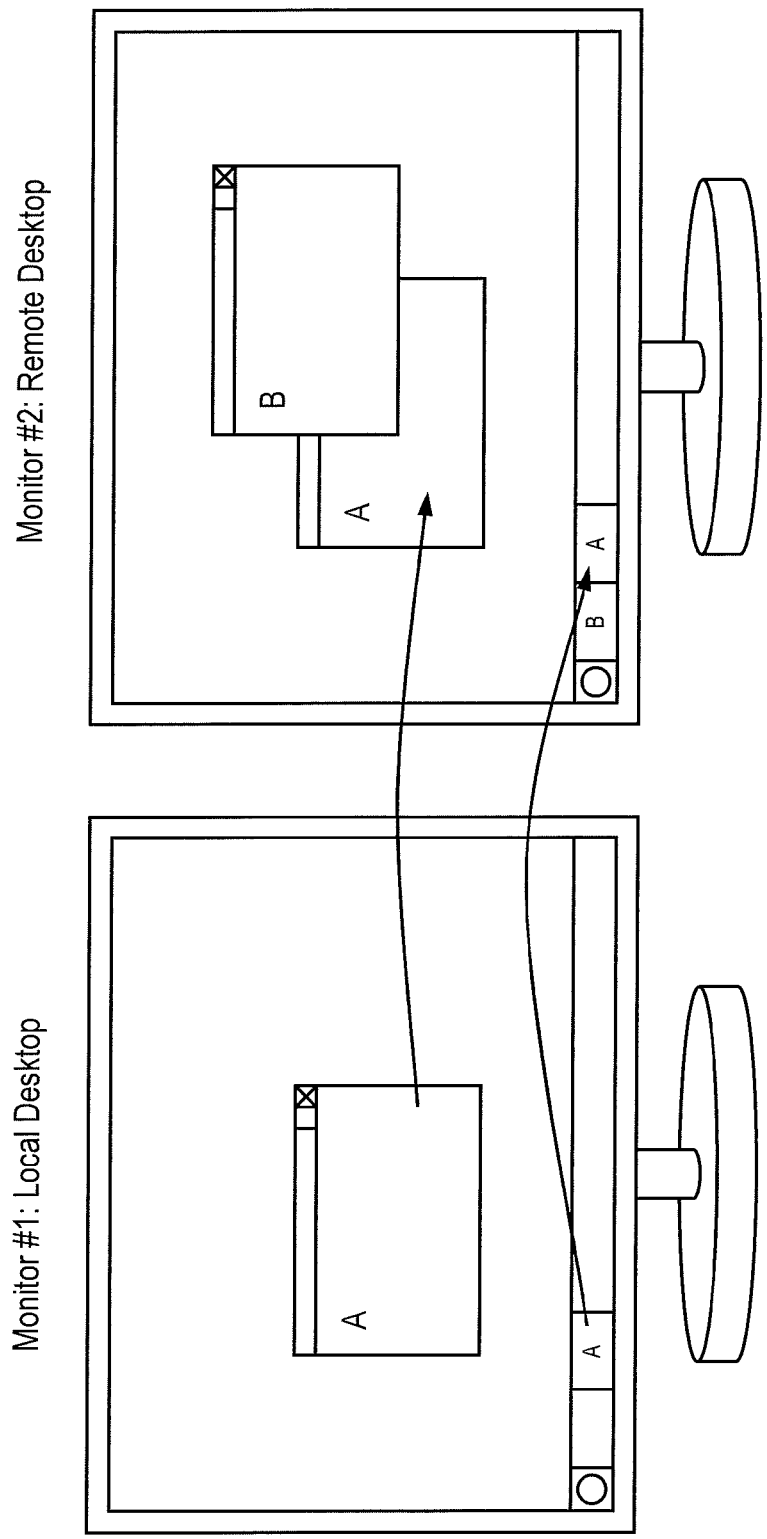

FIG. 7 illustrates moving a local application from a local session to a remote session, according to one embodiment of the present invention. As shown in FIG. 7, initially, the local desktop window (monitor #1) displays a local session containing a local (client) application window associated with a local application A running on the client computer. The remote desktop window (monitor #2) displays a remote session, provided by a remote computer, the remote session initially including a remote application window associated with an application B running on the remote computer. The local application window is displayed completely in the local desktop window (i.e., the local application window does not overlap with the remote session) and has a taskbar item in the taskbar of the local desktop window associated with the client computer, as shown in FIG. 7. The remote application window also has a taskbar item, in the taskbar of the remote desktop window, as also shown in FIG. 7.

As used herein, the terms "remote desktop window" should not be interpreted as a desktop window displayed somewhere remotely. The "remote desktop window" is provided by the remote computer to the user of the client computer and is displayed to the user locally (i.e. within the local desktop), just as the local desktop window. The word "remote" in context of a remote desktop window merely refers, therefore, to the fact that the desktop window displays a session, within the local desktop, that runs on the remote computer, as opposed to the local desktop window displaying a session, also within the local desktop, that runs on the local client computer.

When a user of the client computer starts dragging the local application window towards the remote desktop window, the client computer is configured to detect the movement of the local application window and/or to detect that the local application window now overlaps with the remote session displayed in the remote desktop window. Upon such detection, the client computer sends a "Create Window" command line to the remote computer instructing the remote computer to generate a drone of the local application window and display it in the remote session. As used herein, the term "drone" of an application window refers to a representation or a proxy of the local window generated by creating a remote window with substantially the same size and position, in the local desktop, as the local application window. Because the local application window has been dragged over to overlap with the remote desktop window, the position of the local application window within the local desktop appears, to the user, to be "within" the remote desktop window. Therefore, the drone of the local application window is to be created and displayed by the remote computer within the remote desktop window. In one embodiment, the drone of the application window could be a copy of the application window, within the remote desktop window, that looks exactly like the application window. The command line may also instruct the remote computer to generate a taskbar item associated with the local application A and to display it in the remote session as well. The client computer also removes the taskbar item associated with the local application A from the local taskbar displayed in the local desktop window.

In order to enable a remote computer to generate a drone of the local application window and the associated taskbar item, the client computer may provide all of the necessary information to the remote computer, such as e.g. attributes of the window, size, position in the desktop, etc. In an alternative embodiment, a database in the system may comprise information on the available applications that can be run locally on the client computer, so that a copy of the application windows and that the associated task bar items for each of these applications can be generated by the remote computer. This database can be stored at one location in the system, for example in the remote computer, or parts can be stored locally, for instance in a registry file, and referred to when necessary. Other embodiments are conceivable wherein a number of messages are exchanged between the client computer and the remote computer, for instance when the client computer goes on-line, in order that the latter can establish which windows and task bar items to generate.

In response to receiving the command line from the client computer, the remote computer generates a drone of the local application window that was generated at the client computer. The remote computer also generates a taskbar item associated with the local application A and displays it in the taskbar of the remote session.

A person skilled in the art would recognize how to adapt the concepts described above with regard to facilitating the integration of client-based applications in the server-based user interface (see e.g. paragraphs [0051]-[0063] above) to merging the local application window A into the remote session displayed on the second monitor. Similar to the other techniques described in the present application, the techniques described in association with FIGS. 7-9 may be implemented with remote computers (such as e.g. the server 1) running an interface management program and the client computer (such as the client computer 5) running a subscriber program that facilitate the integration of client-based applications in the server-based remote sessions. The subscriber program running on the client computer 5 co-operates with the interface management program in the exchange between the server 1 and client computer 5 of user input to the interface and output from the interface. Communication between the server 1 and the client computer 5 consists of messages generated by the interface management program and the subscriber program respectively. The detailed description of such co-operation is, therefore, in the interests of brevity, is not repeated here.

Furthermore, concepts described above with respect to providing an integrated icon view (see e.g. paragraphs [0065]-[0085] of the present application) may also be applied to merging the local application window A into the remote session displayed on the second monitor. For example, in an embodiment, as a part of moving the local application window A to the remote session, the client computer could provide an instruction to the remote computer to display an icon associated with the local application A in one or more of a system tray window maintained by the remote computer, a system control area maintained by the remote computer, a notification area window maintained by the remote computer, and a menu (e.g. a "Start" menu) maintained by the remote computer.

In a further embodiment, z-ordering mechanism similar to that described above (see e.g. paragraphs [0087]-[0117] of the present application) may be applied to the application windows displayed in the remote desktop window. To that end, the client computer would provide an instruction that the local application window A is displayed always on top of all other application windows, including the remote desktop window. Continuing with the example described above, the remote computer may then be configured to determine a clipping region as a part of the remote application window overlapping with the drone window and to provide the clipping region to the client computer. The client computer may then be configured to apply the clipping region to the local application window, e.g. when the remote application B receives focus, as shown in FIG. 7. If the clipping region would change for some reason (e.g. if the user moved or changed the size of the application window), the remote computer would recalculate the clipping region and provide the updated clipping region to the client computer. By applying the clipping region to the local application window A (displayed on top of all other windows, including the remote desktop window), it will appear to the user of the client computer that the local application A window is displayed within the remote desktop window and that the window associated with the remote application B is on top of the local application A window within the remote desktop window, while, in reality, the local application window is displayed on top of the remote desktop window. When the local application A receives focus, the client computer would remove the applied clipping region from the local application A window. When the clipping region is not applied to the local application window, it would appear to the user that the window associated with the local application A is on top of all other windows, since the client computer instructed the window associated with the local application A to be displayed on top of all other windows in the local desktop.

In one embodiment, the remote computer may keep track of z-order of all of the application windows, including drones of the local application windows, displayed in the remote session. In another embodiment, the client computer may keep track of z-order of all of the application windows displayed in each of the multiple desktops and provide information regarding z-order to the remote computer(s).

By displaying the local application window on top of all other windows but appropriately applying the clipping region to the local application window, as described above, and by moving the taskbar button associated with the local application from the local desktop window to the remote desktop window, the local application window dragged over a remote session appears to the user to be fully and seamlessly integrated with that remote session. The user may then interact with the local application A in the same manner as the user would do if the local application window was displayed in the local desktop window (such as e.g. provide input to the local application, change the position of the local application window in the desktop window, minimize the local application window, or close the local application window), but the user would feel like he/she is interacting with the local application A via the remote session. Note that when the window associated with the local application A appears to the user to be displayed in the remote desktop window, it is still the client computer that is responsible for detecting the user input with respect to the local application A.

Figure 8:
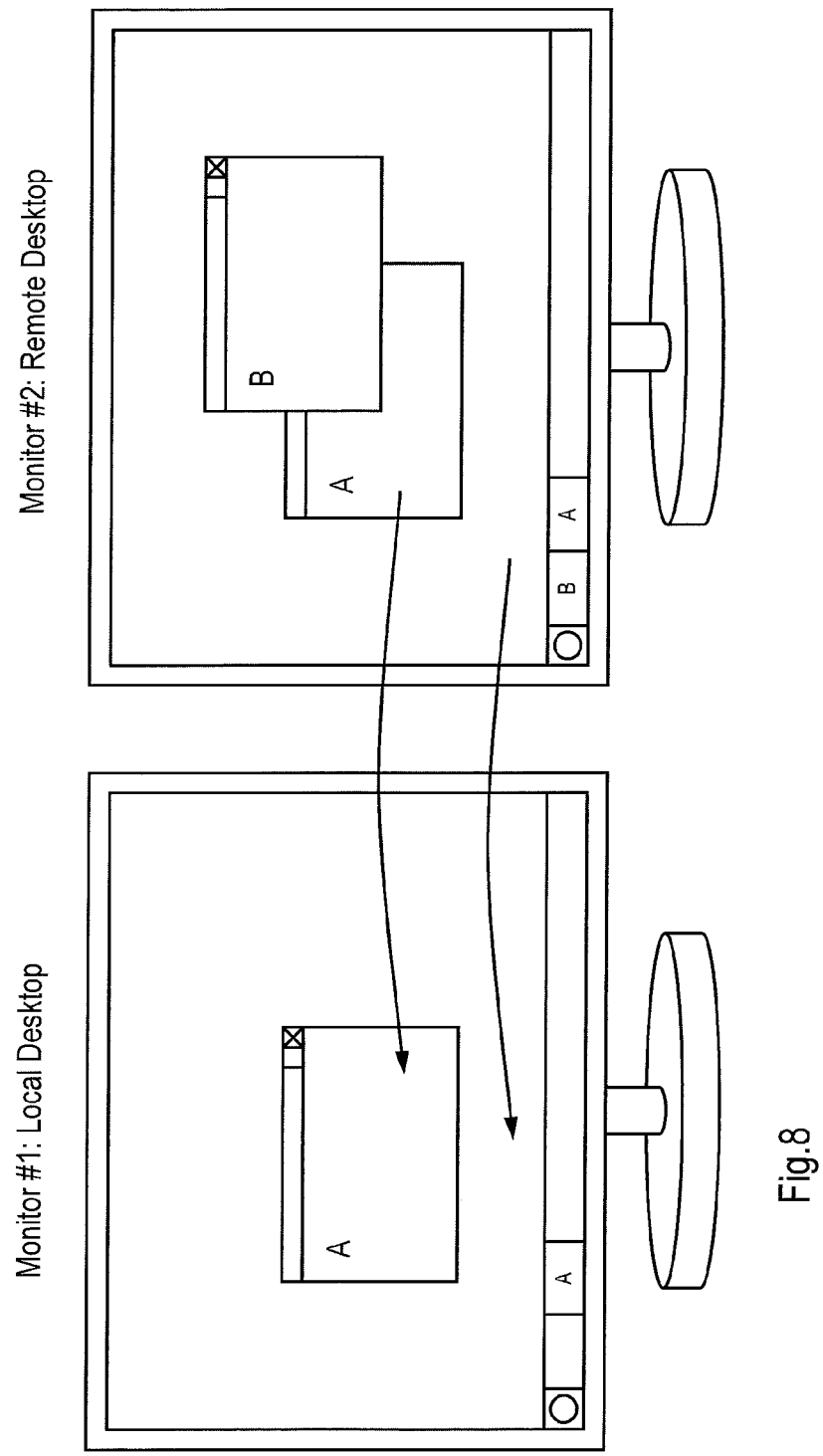

FIG. 8 illustrates moving a local application from a remote session back to the local desktop window, according to one embodiment of the present invention. As shown in FIG. 8, initially, the remote desktop window (monitor #2) displays a remote session, provided by a remote computer, where the remote session includes a remote application window associated with a remote application B running on the remote computer. Because of the seamless integration of the local application window as described in association with FIG. 7, a local application window associated with a local application A running on the client computer also appears to be displayed in the remote session. Also initially, the taskbar of the remote desktop window displays an item associated with the local application A and an item associated with the remote application B. Thus, initially, both the local application A and the remote application B appear to be managed via the remote session. In the embodiment illustrated in FIG. 8, initially, the local desktop window (monitor #1) does not display any application windows. Of course, in other embodiments, the local desktop window may also display one or more application windows.

When a user of the client computer starts dragging the local application window back towards the local desktop window, the client computer is configured to detect the movement of the local application window and/or to detect that the local application window now overlaps with the local session displayed in the local desktop window. Upon such detection, the client computer sends a "Destroy Window" command line to the remote computer instructing the remote computer to delete the drone of the local application window displayed in the remote session. The command line also instructs the remote computer to remove the taskbar item associated with the local application A from the taskbar displayed in the remote desktop window.

In response to receiving the command line from the client computer, the remote computer removes the drone of the local application window displayed in the remote session. The remote computer also removes the taskbar item associated with the local application A displayed in the taskbar of the remote session.

If, initially, as a result of moving the local application window A over the remote session, the remote session included an icon associated with the local application A in one or more of a system tray window maintained by the remote computer, a system control area maintained by the remote computer, a notification area window maintained by the remote computer, and a menu maintained by the remote computer, then the client computer may further send an instruction to the remote computer to remove these respective icons.

The client computer then displays the local application window in the local session of the local desktop window and adds the corresponding taskbar item to the local taskbar. The local application A may now be managed by the user via the local desktop window.

Thus, when the seamlessly integrated local application window is moved away from the remote session, the local application window becomes "unmanaged" by the remote session and its taskbar button is removed from the remote session and is added to the local taskbar. The client computer also removes the "always on top" attribute of the local application window to restore the previous z-order position of the local application window A in the local session. The local application window now behaves like a "normal" application window. Merging, integrated icon view, and z-ordering mechanisms described above may now be applied to properly display the local application window in the local session.

FIG. 9 illustrates moving a local application from one remote session to another, according to one embodiment of the present invention. As shown in FIG. 9, initially, a first remote desktop window (monitor #1) displays a first remote session, provided by a first remote computer, where the first remote session includes a drone of the local application window associated with a local application A running on the client computer. The taskbar of the first remote session displays an item associated with the local application A. The local application window is displayed over the remote session. Thus, initially, the local application A appears to be managed via the first remote session. Such a view of the first remote session may be obtained e.g. by moving the local application window A to the first remote session as described in association with FIG. 7. As also shown in FIG. 9, initially, a second remote desktop window (monitor #2) displays a second remote session, provided by a second remote computer. The second remote session includes a remote application window associated with a remote application B running on the second remote computer. The taskbar of the second remote session displays an item associated with the remote application B.

When a user of the client computer starts dragging the local application window A towards the second remote desktop window, the client computer is configured to detect the movement of the local application window and/or to detect that the local application window now overlaps with the second remote session displayed in the second remote desktop window.

Upon such detection, the client computer sends a "Destroy Window" command line to the first remote computer instructing the first remote computer to delete the drone of the local application window displayed in the first remote session. The command line also instructs the first remote computer to remove the taskbar item associated with the local application A from the taskbar displayed in the first remote desktop window.

The client computer also sends a "Create Window" command line to the second remote computer instructing the second remote computer to generate a drone of the local application window and display it in the second remote session. The command line also instructs the second remote computer to generate a taskbar item associated with the local application A and to display it in the second remote session as well.

In response to receiving the command line from the client computer, the first remote computer removes the drone of the local application window displayed in the first remote session. The first remote computer also removes the taskbar item associated with the local application A displayed in the taskbar of the first remote desktop window.

In response to receiving the command line from the client computer, the second remote computer generates a drone of the local application window that was generated at the client computer. The second remote computer also generates a taskbar item associated with the local application A and displays it in the taskbar of the second remote desktop window. All of the discussions with respect to incorporating the local application window in a remote session provided in association with FIG. 7 are applicable here for incorporating the local application window in the second remote session and, therefore, are not repeated.

While FIG. 9 was described in the context of the second remote session being provided by the second remote computer, similar teachings can be applied if the second remote session was provided by the first remote computer.

Applicable to all of the embodiments described in association with FIGS. 7-9, while the application window B was described as a window associated with an application configured to run on a remote computer, the application window B could as well be an application window associated with an application running on the client computer or it could be an application window associated with an application running on a remote computer different from that in whose remote session the application window B is displayed.

Further, in all of the embodiments described in association with FIGS. 7-9, if a remote session would disappear from the remote desktop because e.g. the remote desktop session ended or was minimized by the user, the client computer could provide an instruction for all of the local application windows that were displayed in and managed by that remote session to enter again the client desktop window to be displayed in and managed by the local session, together with the corresponding taskbar items.

Also applicable to all of the embodiments described in association with FIGS. 7-9, it is possible that when a user starts dragging a local application window, there are more than one choice for new desktop windows to display the local application window in (e.g. there could be more than two other desktop windows in which the local application window A could be displayed). In such an environment, the client computer may be configured to determine the desktop window in which the local application window A is to be displayed in response to the user dragging the window by comparing overlaps with the local application window with each of the desktop windows and selecting the desktop window with the maximum overlap as the one in which the local application window is to be displayed. The client computer may then send appropriate commands to the computer associated with the selected desktop window regarding incorporation of the local application A into the session displayed in that desktop window, as described above.

The foregoing description provides techniques for fully integrating the local application windows in the z-order of the remote session. Users that have a desktop with multiple monitors can have one or more remote sessions on a subset of the available monitors and can leave other monitors available for local desktop use. Local application windows can be moved over all monitors and become managed or unmanaged depending on whether they enter or leave a remote session respectively.

Those skilled in the art will appreciate that the invention is not limited to the above-described embodiments, which can be varied in a number of ways within the scope of the claims. For instance, embodiments of the system can exist that comprise additional means, e.g. function keys, for switching between windows and/or applications. In other embodiments, the desktop windows described in association with FIGS. 7-9 could all be displayed within a single monitor or within several monitors, but where the number of these monitors is less than the number of different desktop windows. Whether displayed in separate monitors or in the same monitors, the different desktop windows, both local and remote, may be understood to be displayed within the local desktop.

It is to be understood that any feature described in relation to any one embodiment may be used alone, or in combination with other features described, and may also be used in combination with one or more features of any other of the embodiments, or any combination of any other of the embodiments.

One embodiment of the invention may be implemented as a program product for use with a computer system. The program(s) of the program product define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. A client computer for use in a networked computing environment comprising one or more processors, at least a client desktop window and a first remote desktop window configured to be displayed to a user of the client computer, wherein the client desktop window is configured to display a session running on the client computer and the first remote desktop window is configured to display a session running on a first remote computer, the client computer configured to manage a client application window associated with an application configured to run on the client computer, the client computer configured to:
   detect a first user input regarding movement of the client application window from the client desktop window to the first remote desktop window;
   remove a task bar icon associated with the client application window from a task bar displayed in the client desktop window;
   instruct the first remote computer to generate a drone of the client application window in the first remote desktop window;
   instruct the first remote computer to display the task bar icon associated with the drone of the client application window in a task bar displayed in the first remote desktop window; and display the drone of the client application window always on top of all other remote desktop windows.

2. The client computer according to claim 1, wherein the session running on the remote computer comprises at least one additional application window associated with an application configured to run on the remote computer, and wherein the client computer further configured to:
   receive a clipping region generated by the remote computer, where the clipping region comprises a part of the at least one additional application window overlapping with the drone of the client application window generated by the remote computer; and
   apply the clipping region to the client application window.

3. The client computer according to claim 2, further configured to:
   remove the clipping region applied to the client application window when the application configured to run on the client computer receives focus.

4. The client computer according to claim 1, wherein detecting a first user input comprises detecting that the client application window is being moved away from the client desktop window and determining that the client application window at least partially overlaps with the first remote desktop window.

5. The client computer according to claim 4, wherein determining that the client application window at least partially overlaps with the first remote desktop window comprises determining that, following the first user input, an overlap of the client application window with the first remote desktop window is greater than an overlap of the client application window with the client desktop window.

6. The client computer according to claim 5, wherein the networked computing environment further comprises a plurality of remote desktop windows configured to be displayed to the user of the client computer and wherein determining that the client application window at least partially overlaps with the first remote desktop window further comprises determining that, following the first user input, an overlap of the client application window with the first remote desktop window is greater than each of overlaps of the client application window with each of the plurality of remote desktop windows.

7. The client computer according to claim 1, further configured to instruct the first remote computer to display an icon associated with the client application window in one or more of a system tray window maintained by the first remote computer, a system control area maintained by the first remote computer, a notification area window maintained by the first remote computer, and a menu maintained by the first remote computer.

8. The client computer according to claim 1, further configured to:
   detect a second user input regarding movement of the client application window from the first remote desktop window to a second remote desktop window, wherein the second remote desktop window is configured to display a session running on a second remote computer;
   instruct the first remote computer to remove the task bar icon associated with the client application window from the task bar displayed in the first remote desktop window;
   instruct the second remote computer to display the task bar icon associated with the client application window in a task bar displayed in the second remote desktop window; and
   instruct the second remote computer to generate a drone of the client application window in the second remote desktop window.

9. A remote computer for use in a networked computing environment comprising one ore more processors, at least a client desktop window and a remote desktop window configured to be displayed to a user of a client computer, wherein the client desktop window is configured to display a session running on the client computer and the remote desktop window is configured to display a session running on the remote computer, the remote computer configured to:
   generate a drone of a client application window associated with an application configured to run on the client computer in response to receiving an instruction from the client computer to generate the drone of the client application window in the remote desktop window; and
   display a task bar icon associated with the drone of the client application window in a task bar displayed in the remote desktop window.

10. The remote computer according to claim 9, wherein the session running on the remote computer comprises at least one additional application window associated with an application configured to run on the remote computer, and wherein the remote computer is further configured to:
   determine a clipping region, where the clipping region comprises a part of the additional application window overlapping with the drone of the client application window generated by the remote computer; and
   provide the clipping region to the client computer.

11. The remote computer according to claim 10, further configured to maintain a z-order ranking of the additional application window and the drone of the client application window.

12. The remote computer according to claim 9, further configured to display an icon associated with the client application window in one or more of a system tray window maintained by the remote computer, a system control area maintained by the remote computer, a notification area window maintained by the remote computer, and a menu maintained by the remote computer.

13. A computer-readable non-transitory storage medium containing a set of instructions that, when executed by a processor, perform a method comprising:
   detecting a first user input regarding movement of a client application window from a client desktop window to a first remote desktop window, wherein a networked computing environment comprises at least the client desktop window and the first remote desktop window configured to be displayed to a user of a client computer and wherein the client desktop window is configured to display a session running on the client computer and the first remote desktop window is configured to display a session running on a first remote computer and wherein the client application window is associated with an application configured to run on the client computer;
   removing a task bar icon associated with the client application window from a task bar displayed in the client desktop window;
   instructing the first remote computer to generate a drone of the client application window in the first remote desktop window;
   instructing the first remote computer to display the task bar icon associated with the drone of the client application window in a task bar displayed in the first remote desktop window; and
   displaying the drone of the client application window always on top of all other remote desktop windows.

14. The computer-readable non-transitory storage medium according to claim 13, wherein the session running on the remote computer comprises at least one additional application window associated with an application configured to run on the remote computer, and wherein method further comprises:
   receiving a clipping region generated by the remote computer, where the clipping region comprises a part of the at least one additional application window overlapping with the drone of the client application window generated by the remote computer; and
   applying the clipping region to the client application window.

15. The computer-readable non-transitory storage medium according to claim 14, wherein the method further comprises:
   removing the clipping region applied to the client application window when the application configured to run on the client computer receives focus.

16. A computer-readable non-transitory storage medium containing a set of instructions that, when executed by a processor, perform a method comprising:
   generating a drone of a client application window associated with an application configured to run on a client computer in response to receiving an instruction from the client computer to generate the drone of the client application window in a remote desktop window, wherein a networked computing environment comprises at least a client desktop window and the remote desktop window configured to be displayed to a user of the client computer and wherein the client desktop window is configured to display a session running on the client computer and the remote desktop window is configured to display a session running on the remote computer; and
   displaying a task bar icon associated with the drone of the client application window in a task bar displayed in the remote desktop window.

* * * * *